Figure 1:
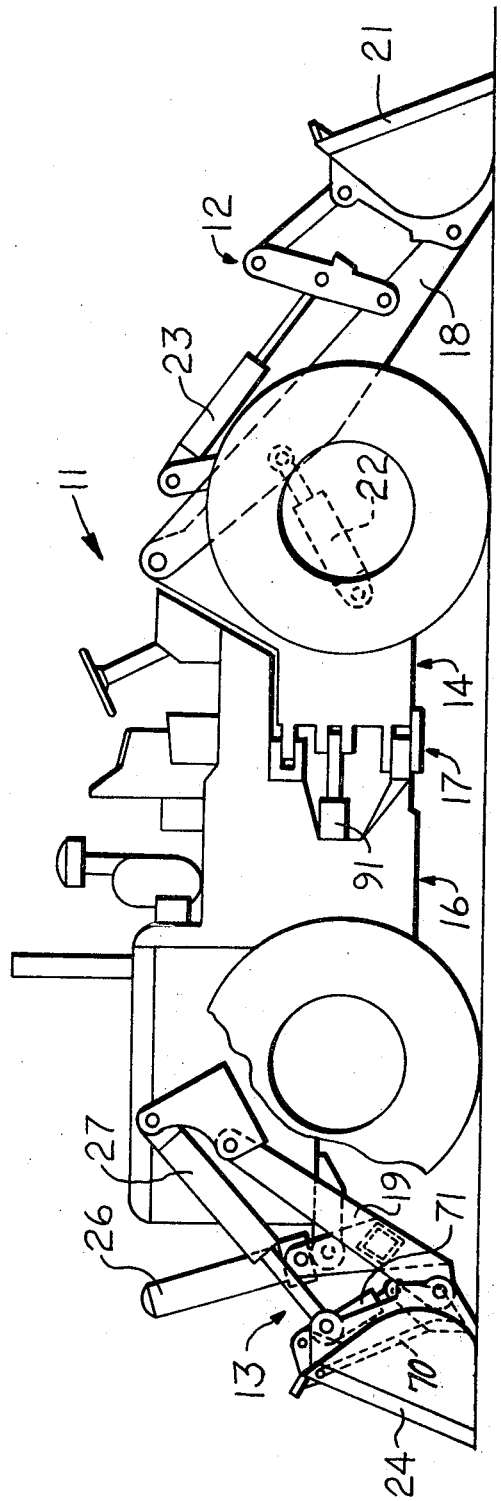

United States Patent [19]
Peterson et al.

[11] 3,709,100
[45] Jan. 9, 1973

[54] HYDRAULIC IMPLEMENT CONTROL CIRCUIT

[75] Inventors: Wayne A. Peterson; Edward A. Wirtz, both of Joliet, Ill.

[73] Assignee: Caterpillar Tractor Co., Peoria, Ill.

[22] Filed: June 11, 1971

[21] Appl. No.: 152,443

Related U.S. Application Data

[62] Division of Ser. No. 5,577, Jan. 26, 1970, Pat. No. 3,606,051.

[52] U.S. Cl. ........................91/189, 91/412, 91/447
[51] Int. Cl. .........................F15b 11/16, F15b 13/06
[58] Field of Search.................91/189, 413, 447, 412

[56] References Cited

UNITED STATES PATENTS

| | | |
|---|---|---|
| 2,634,552 | 4/1953 | Wooling..................................91/413 |
| 2,902,053 | 9/1959 | Seddon...................................91/413 |
| 3,181,430 | 5/1965 | Freedy et al............................91/413 |
| 3,301,136 | 1/1967 | Bolton et al. ..........................91/189 |

*Primary Examiner*—Paul E. Maslousky
*Attorney*—Fryer, Tjensvold, Feix, Phillips & Lempio

[57] ABSTRACT

A hydraulic circuit for a machine having implements arranged on two portions of the machine, a fluid tank and implement control valve assembly being arranged on each portion of the machine, a pump for drawing fluid from one of the tanks and delivering it to the control valve assemblies with conduits for returning exhaust fluid to either of the tanks, a fluid equalizing line and an air equalizing line interconnecting the two tanks to assure an adequate supply of hydraulic fluid in each tank.

3 Claims, 2 Drawing Figures

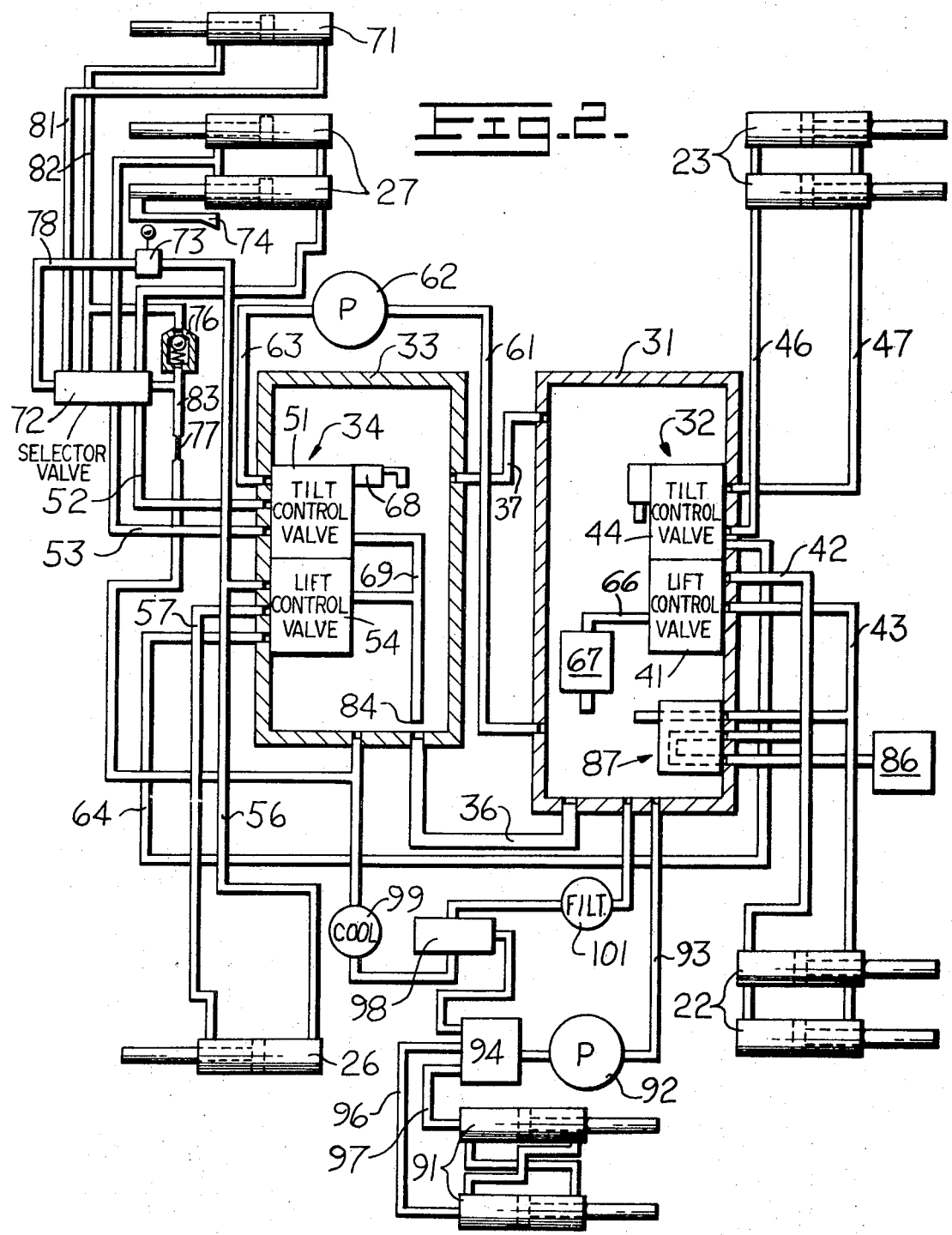

HYDRAULIC IMPLEMENT CONTROL CIRCUIT

This application is a division of application Ser. No. 5,577, filed 01.26.70, now U.S. Pat. No. 3,606,051.

The present invention relates to a hydraulic control circuit for a machine or vehicle having hydraulically operated implements disposed on two portions of the machine. The control circuit of the present invention is particularly suitable for use on articulated material handling vehicles which have hydraulically operated implements on both articulated sections of the vehicle. The invention is described below for example with reference to an articulated loader vehicle having a bucket pivotally supported at each end by lift arms, hydraulic lift and tilt motors being associated with each bucket to adjust its position relative to the vehicle. The present invention may be used to particular advantage on such articulated vehicles since it minimizes the number of high pressure lines crossing the articulated axis of the vehicle. It also permits fluid under pressure to be provided for operating implements on both articulated sections from a single fluid source or pump.

The invention also provides a particularly simple and novel circuit for providing fluid to control valve assemblies associated with each of the tanks for operating the implements. Fluid is drawn from one of the tanks by a pump and delivered to the control valve assemblies with exhaust fluid being returned to either of the tanks depending upon the mode of operation for the implements. Fluid and air equalizing lines interconnects the two tanks to assure a proper fluid level in each tank.

A hydraulic control circuit for a material handling vehicle is also described in U.S. Pat. application Ser. No. 834,776, now U.S. Pat. No. 3,604,205, filed June 19, 1969 by Thomas H. Geselbracht and assigned to the assignee of the present invention.

The hydraulic circuit of that application includes two hydraulic fluid tanks or reservoirs for use on an articulated vehicle having a hydraulically operated implement on one articulated section and the prime mover or engine arranged on the other articulated section. A first tank and a hydraulic implement pump are arranged on the articulated section with the engine. Fluid is drawn from the first tank by the pump and delivered to the implement on the other articulated section with exhaust fluid being returned to a second tank arranged on the same articulated section as the implement. The two tanks are interconnected to permit flow from the second tank back to the first tank so that the fluid may be recycled to the pump.

In comparison to the prior art of which the above application may be considered most illustrative, the present invention provides a simple and novel hydraulic circuit for providing fluid under pressure to implements arranged in two relatively remote locations. Exhaust fluid may be returned to either of two hydraulic tanks depending upon the mode of operation for the implements.

Accordingly, it is an object of the present invention to provide a simple and novel hydraulic control circuit for delivering fluid under pressure to hydraulically operated implements located on two portions of a machine.

It is a further object to provide such a circuit wherein fluid may be drawn from one of the tanks for pressurization and delivery to the implements with exhaust fluid being returned to either of the tanks depending upon the mode of operation for the implement.

It is still a further object to provide such a hydraulic circuit including means for limiting the hydraulic fluid level in at least one of the tanks.

It is still a further object of the invention to provide such a circuit for use on an articulated loader vehicle having loader buckets arranged on each articulated section.

Additional objects and advantages of the present invention are made apparent in the following description having reference to the accompanying drawings.

In the drawings:

FIG. 1 is a side view in elevation of an articulated vehicle having loader buckets on each articulated section for which the present hydraulic circuit is particularly suited; and FIG. 2 is a partially schematic and partially sectioned view of a hydraulic control circuit including various novel features of the present invention.

FIG. 1 illustrates a vehicle or machine of a type for which the present hydraulic circuit is particularly suited. The vehicle 11 includes first and second implement assemblies indicated respectively at 12 and 13, arranged on different portions of the vehicle 11. As illustrated in FIG. 1, the vehicle 11 is a loader vehicle having portions or sections 14 and 16 secured together by an articulated pivot connection indicated at 17. The implement assemblies 12 and 13 are loader buckets pivotally supported upon the articulated section 14 and 16 by means of lift arms such as those indicated respectively at 18 and 19. The position of the first bucket 21 is adjusted relative to the vehicle by a pair of hydraulic lift motors or jacks 22 and a pair of hydraulic tilt motors or jacks 23. Similarly, the position of the second bucket 24 is also adjusted relative to the vehicle by a hydraulic lift motor or jack 26 and a pair of hydraulic tilt motors or jacks 27. The hydraulic motors 22, 23, 26 and 27 are also illustrated in FIG. 2.

The loader vehicle described and illustrated in FIG. 1 is particularly suited for combined load and transport operations. The first bucket 21 mounted at the front of the vehicle may be loaded with the vehicle travelling forwardly and then raised on its lift arms to a suitable carry position. The bucket 24 at the rear of the vehicle may be separately loaded with the vehicle travelling in reverse and then also raised to a suitable carry position. In addition to increasing the load carrying capacity of the vehicle, the two buckets tend to balance each other and thus further facilitate transport operation of the vehicle.

Referring now to FIG. 2, a hydraulic control circuit suitable for use with a vehicle or machine of the type illustrated in FIG. 1, includes a first hydraulic tank or reservoir 31 and a first control valve assembly 32 for operating the first implement assembly 12. The tank 31 and first valve assembly 32 are arranged on the forward articulated section 14 of the vehicle. A second hydraulic tank 33 and a second control valve assembly 34 for operating the implement assembly 13 are mounted on the rearward articulated section 16 of the vehicle. The two tanks are interconnected by means of a fluid equalizing line 36 and an air equalizing line 37 which are described in greater detail below.

The first control valve assembly 32 includes a lift control valve 41 for communicating fluid under pressure to the lift jacks 22 by means of conduits 42 and 43. The control valve assembly 32 also includes a tilt control valve 44 in communication with the tilt jacks 23 by means of conduits 46 and 47. The second control valve assembly includes a tilt control valve 51 in communication with the tilt jacks 27 by means of conduits 52 and 53 and a lift control valve 54 in communication with the lift jack 26 by means of conduits 56 and 57.

Fluid for operating the various implements is drawn from the first tank 31 through a conduit 61 by an implement pump 62 and delivered under pressure to the second tilt control valve 51 through a conduit 63. At least when all of the various control valves are positioned in neutral, fluid from the pump 62 is delivered in series from the tilt control valve 51 to the second tilt control valve 54 and then to the second control valve 41 and 44 by means of a conduit 64. With the control valves all positioned in neutral, fluid from the pump 62 is returned from the tilt control valve 44 to the first tank by means of a conduit 66 and a filter 67.

The second control valve assembly is designed to interrupt this series communication of fluid during selected modes of operation for the implements. For example, the second tilt control valve 51 may be moved out of its neutral position to cause either retraction or extension of the tilt control jacks 27. The tilt control valve 51 is of a conventional interrupted series type so that when it is moved out of its neutral position for either extension or retraction of the jacks 27, fluid communication with the lift control valve 54 is terminated and exhaust fluid is directed to the second tank 33 through a relief valve 68 and a return conduit 69. This feature provides for operating preference of the tilt jacks 27 over the lift jack 26. It also prevents operation of either the lift or tilt jacks for the front bucket 21 to provide protection both for the vehicle and its operator.

The second lift control valve 54 may be also moved into two additional positions to cause either extension or retraction of the lift jack 26. When the lift control valve 54 is positioned to direct fluid under pressure to the lift jack 26 through the conduit 56 in order to raise the bucket 24, exhaust fluid in the line 57 continues to be communicated to the first control valve assembly 32 through the conduits 64 to permit simultaneous operation of the front bucket 21. However, when the lift control valve 54 is positioned to direct fluid under pressure to the lift motor 26 through the conduit 57 in order to lower the rear bucket 24, the lift control valve 54 also interrupts series communication of the control valve assemblies and directs exhaust fluid to the second tank 33 through the conduit 69. This capability of the lift control valve 54 is also a safety feature to prevent operation of the front bucket 21 while the rear bucket 24 is being lowered.

Since the rear bucket 24 is mounted on relatively short lift arms 19 and cannot be raised as high as the front bucket 21, it is particularly contemplated that the rear bucket 24 be adapted for ejector unloading under the influence of a hydraulic ejector motor or jack 71 illustrated in FIG. 2. The ejector motor 71 is coupled into the hydraulic circuit together with the tilt jacks 27 by means providing for automatic ejector action when the tilt control valve 51 is moved into a dump position.

The means providing for automatic ejector action include a selector valve 72, a valve 73 arranged for actuation by a cam 74 associated with one of the tilt motors 27, a biasing relief valve 76 and a restrictive orifice 77. These components are interconnected with the tilt control valve 51, the tilt motors 27 and the ejector motor 71 for accomplishing the following mode of operation. When the tilt control valve 51 is moved to its dump position, fluid is communicated through the selector valve to the head ends of the tilt jacks 27 causing extension of those motors and tilting the bucket 24 forwardly. Extension of the tilt jacks 27 continues until the valve 73 is actuated by the cam 74. It may be noted from FIG. 2 that valve 73 is in communication with conduit 56 and thus with the head end of the lift jack 26. Fluid in conduit 56 is thus pressurized by a load carried in the rear bucket 24. Upon actuation of the valve 73, this pressure is communicated through a conduit 78 to the selector valve 72. Fluid pressure in the conduit 78 shifts the selector valve 72 so that the conduits 52 and 53 are placed in communication with the ejector motor 71 by means of conduits 81 and 82. Pressurized fluid from the tilt control valve 51 is then directed to the ejector jack through conduit 81 for ejector unloading of the bucket 24.

As the ejector jack reaches complete extension, fluid pressure in its head end and the conduit 81 increases causing the relief valve 68 to open. Valve 68 then permits pressurized fluid from the tilt control valve 51 to enter the second tank through the conduit 69 until the tilt control valve 51 is shifted out of its dump position. When the control valve 51 is shifted to its rack back positions, fluid under pressure is first communicated to the ejector jack 71 through the conduit 82 to restore the ejector jack to its retracted position. When the ejector jack is fully retracted, fluid pressure increases in the conduit 82 and passes through the biasing relief valve 76 into a conduit 83 which is in communication with the selector valve 72 and includes the restrictive orifice 77. The restrictive orifice 77 causes fluid pressure in the conduit 83 to again shift the selector valve 72 to its original position with the lift control valve 51 being in communication with the tilt jacks 27. Fluid pressure from the tilt control valve 51 then causes retraction of the tilt motors 27 and rack back of the bucket 24.

It may be noted that from the above description fluid from the implement pump 62 is normally returned to the first tank 31 through the conduit 66. However, when either of the first tilt and lift control valves 51 or 54 is properly positioned, exhaust fluid may be returned to the second tank 33 through the conduit 69. In order to prevent undue agitation of fluid in the second tank 33 and to assist in maintaining a proper fluid level in that tank, the return conduit 69 terminates as indicated at 84 in facing relation with and adjacent the fluid equalizing line 36. Fluid being exhausted through the conduit 69 accordingly tends to be directed into the equalizing line 36. An added advantage is realized through this arrangement since the velocity of fluid exiting the return conduit 69 tends to create a supercharging effect for increasing the rate of transfer from the second tank 33 to the first tank 31 through the fluid equalizing line 36.

It is desirable to maintain a maximum fluid level within the second tank 33 so that fluid will not tend to completely fill that tank. If the second tank 33 should become filled with fluid, additional fluid being exhausted into that tank could tend to exceed the capacity of the fluid equalizing line 36 and cause rupture of the second tank. In order to prevent this from happening and to maintain a maximum fluid level within the second tank, the air equalizing line 37 is in communication with the second tank at approximately the maximum desired fluid level. Thus, the interconnection of the air equalizing line 37 with the second tank tends to assure that a compressible air pocket is maintained within the top of the second tank thus protecting that tank from possibly harmful effects of fluid pressure surges.

Additional hydraulic components are arranged within the circuit of FIG. 2 for facilitating operation of a vehicle of the type illustrated in FIG. 1. For example, a fluid accumulator 86 is arranged in communication with the conduit 42 by means of a manually controlled valve 87. During transport operation, the accumulator 86 is in communication with the head ends of the lift jacks 22 and provides a cushioning effect for a load being carried in the bucket 21 (See FIG. 1). When the bucket 21 is to be operated in either a loading or dumping cycle for example, the accumulator 86 is blocked from communication with the conduit 42 by means of the valve 87.

The hydraulic control circuit also includes a hydraulic steering circuit for operating hydraulic steering motors or jacks 91 which are interconnected between the articulated sections 14 and 16 of the vehicle. The steering portion of the circuit includes a steering pump 92 which draws fluid from the first tank 31 through a conduit 93. Fluid from the pump 92 is delivered to a steering control valve 94 which may be regulated to selectively direct fluid to the steering jacks 91 through the conduits 96 and 97. Exhaust fluid from the steering control valve 94 and the steering jacks 91 is directed to a flow control valve 98, the valve 98 directs a relatively small portion of the exhaust fluid through a cooler 99 to the second tank 33. The remainder of the exhaust fluid flow is directed back to the first tank 31 through a filter 101. Since only a small portion of the exhaust fluid from the steering circuit need be cooled to maintain the hydraulic fluid at a desired working temperature, this arrangement permits the cooler 99 to be designed with a relatively small capacity for purposes of economy.

What is claimed is:

1. A hydraulic circuit providing for dump operation of a tilt motor and ejector motor of an ejector bucket assembly for a bucket loader, comprising a source of fluid under pressure, a tilt control valve in communication with the source, a selector valve in communication with the control valve, the selector valve having two operating positions for communicating the control valve with either the tilt motor or lift motor, first sensing means associated with the tilt motor and in communication with the selector valve, the first sensing means being effective to sense a selected operating position of the tilt motor and thereupon reposition the selector valve, and second sensing means associated with the ejector moor and in communication with the selector valve, the second sensing means being effective to sense a selected operating position of the ejector motor and thereupon reposition the selector valve.

2. The invention of claim 1 wherein the first sensing means comprises a cam valve arranged for actuation by the tilt motor, the cam valve being in fluid communication with the selector valve and a source of fluid pressure.

3. The invention of claim 1 wherein the second sensing means comprises a conduit in communication with the ejector motor, the conduit also being in communication with the selector valve by means of a biasing relief valve.

* * * * *